July 31, 1928.
S. C. IGOU
1,679,036
TRANSMISSION
Filed Oct. 6, 1924    2 Sheets-Sheet 2
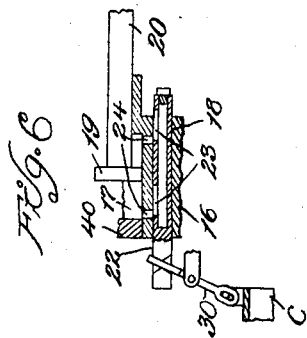
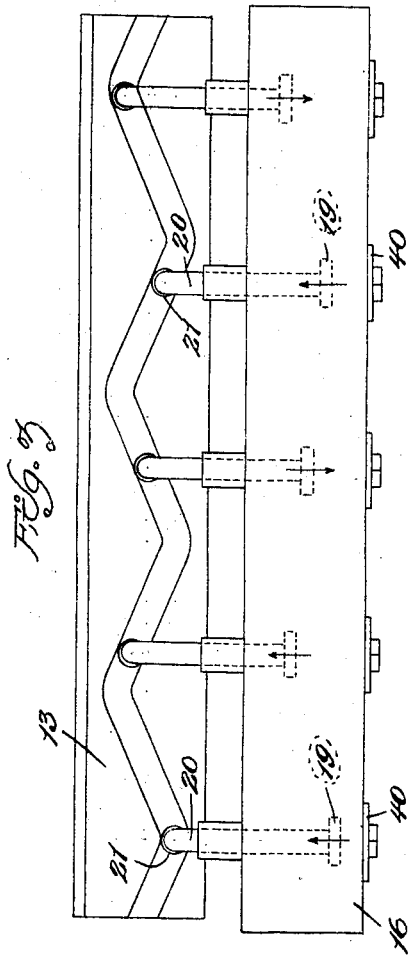
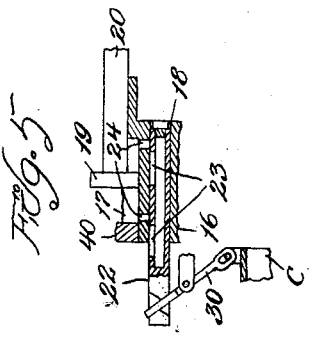
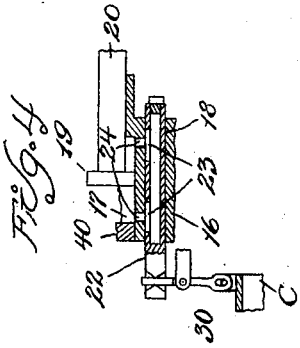
INVENTOR
Samuel C. Igou Patented July 31, 1928.

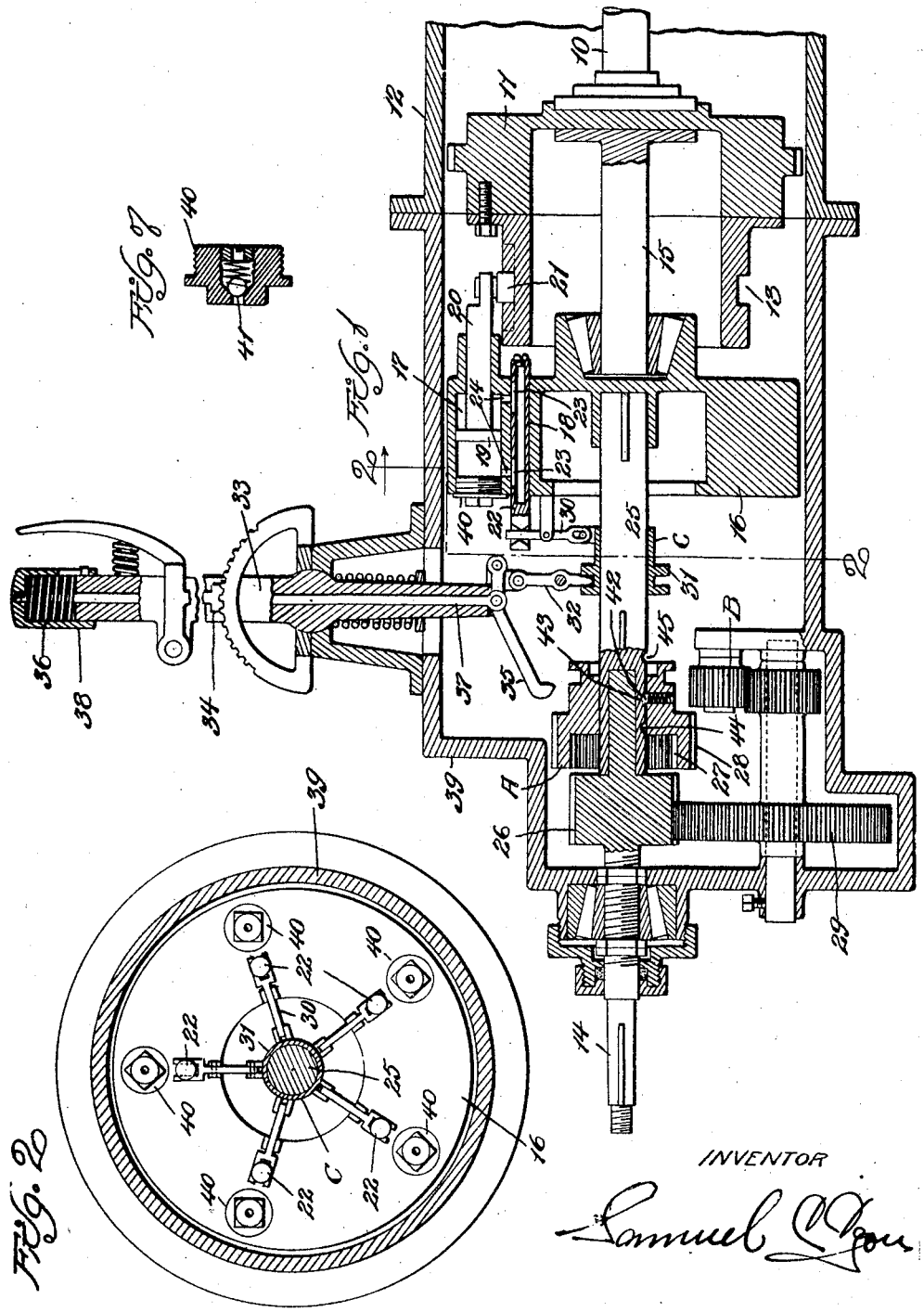

1,679,036

UNITED STATES PATENT OFFICE.

SAMUEL C. IGOU, OF ST. LOUIS, MISSOURI.

TRANSMISSION.

Application filed October 6, 1924. Serial No. 741,933.

My invention relates to improvements in transmissions, or mechanisms, for transmitting the revolutions of a driving shaft to a driven shaft, and is particularly applicable to automobiles employing internal combustion engines whose cranks, or driving shafts, are irreversible, and wherein there is requirement for revolving the driven shaft, either with or reversely of, and at varying speed ratios relative to the driving shaft.

My improvements belong to the class of transmissions involving positive connections between the driving and driven shafts in which is included the sliding transmission which is a combination of toothed wheels on parallel shafts, as in a motor car, whereby the motor shaft may turn at nearly constant speed and cause different speeds for the driving axle or driving wheels. This is done by having toothed wheels of differing diameters on one shaft and on another shaft complementary toothed wheels which may slide lengthwise on the shaft and come in line, or mesh, with the desired wheel on the first shaft, reversing of the driven shaft being effected by throwing an additional idle or transmitting wheel into the train.

This art also includes a number of fluid operated gear shifting means.

In all such mechanisms the speed of the driven shaft relative to the driving shaft is governed by bringing into service different trains of gears having different ratios between which trains there is no speed flexibility.

The primary object of my invention is to provide a mechanism comprising gear elements whereby a driven shaft may be positively driven by a driving shaft, either in a direction with or reversely of the driving shaft, and means providing infinite flexibility of speed relation of the driven shaft to the driving shaft in either direction of revolution.

A further object of my invention is to provide a unidirectional transmission involving a constant mesh toothed gear connection between a driving and driven shaft and a means whereby infinite speed flexibility may be effected between the driving and driven shafts.

A further object is to provide a transmission including means for reversing the motion of the driven shaft, means for producing infinite speed ratios between the driven and driving shafts and means for idling the driven shaft during an operation of the reversing means.

With the foregoing and other objects, as will be made clear, in view, my improvements consist in the novel construction, arrangement and combination of parts, as hereinafter described, definitely pointed out in my claims and illustrated by the accompanying drawings, in which:

Fig. 1 is a longitudinal sectional elevation of a transmission constructed in accordance with my invention.

Fig. 2 is a transverse sectional elevation as taken on the line indicated 2—2 of Fig. 1.

Fig. 3 shows in diagram elemental parts of the hydraulic clutch between the driving and driven shafts.

Figs. 4, 5 and 6 are diagrams showing the valves controlling the clutch mechanism in neutral, full speed forward, and limited speed reverse positions, respectively.

Fig. 7 is an enlarged detail, sectional elevation of a closure-plug, employed in the dash-pots of the clutch, showing a check valve therein, providing for maintaining the dash-pot constantly filled.

Referring, by numerals, to the drawings, 10, 11 and 12 designate, respectively, the driving shaft, fly wheel and case, which may be, or are, of ordinary construction. A race 13, including a plurality of cams (see Fig. 3) is adapted to rotate with the driving shaft 10 and forms part of a clutch mechanism between the driving shaft 10 and the driven shaft 14. Extending rearwardly from the shaft 10 and fly wheel 11 is a stub-shaft 15 for the support of a block 16, having formed therein a plurality of dash pots 17, and a plurality of bores 18, in the former of which there are pistons 19 carrying stress bars 20 and rollers 21, which rollers are engaged in the cam race 13 and in the latter of which there are tubular valves 22 having ports 23, whose motion controls the ports 24—24 of the dash-pots 17 and permit free, restricted, or partially restricted motion of the pistons with a consequent idling, rotating at the speed of the driving shaft, or a rotating at graded speeds, of the block 16 and parts carried thereby. Between the shafts 14 and 15 is a shaft 25 which is secured to rotate with the block 16 and is loosely connected with the shaft (driven) 14. The shaft 14 has secured for rotation therewith a gear wheel 26, and slidably, but non-rotatably secured to the shaft 25 is a wheel A, having internal teeth 27 for mesh with the gear 26 and external teeth 28 for engagement with a reducing train B, including a gear 29 in constant mesh with the recited gear 26.

A spider C is provided for the movement of the tubular valves 22 and is comprised of a lever 30, for each valve, a sleeve 31 slidably carried by the shaft 25, a rocking lever 32 for sliding the sleeve, a control lever 33 and a holding means 34, such as the pawl and sector shown, at the control lever.

For the movement of the sliding gear A there is provided a pawl 35 carried by the control lever 33, normally held to non-functioning position (as shown) by a spring 36, acting upon a push-rod 37 and provided with a button 38 for manually moving the pawl to functioning position.

The numeral 39 designates a case in open communication with the case 12 and is arranged to contain a lubricant in which the parts all operate and from which the dash-pots 17 are supplied through the ends, or plugs, 40, containing check valves 41, as shown in detail in Fig. 7.

In Fig. 1 both the valves 22 and the gear A are in neutral position; that is, the ports 23 (in the valves) and the ports 24 (in the dash-pots) are in full open position so that upon a revolving of the cam race 13 the stress bars 20 and pistons 19 operate only to freely surge the oil through the dash-pots and valves without effecting rotation of the block 16 and shaft 25, and the gear A is out of mesh with both gears 26 and B.

For holding the gear A in its various positions, as set by the lever 33 and pawl 35, I provide a spring pressed ball 42, carried by the gear and dwells 43, 44 and 45 in the shaft 25, which are engaged by the ball to hold the gear in neutral (as shown), forward and reverse positions, respectively.

In operation, let is be assumed that the engine is running under its own and ordinary control; the shaft 10, fly wheel 11 and cam race 13 rotating; the stress bars 20 and pistons 19 surging the oil freely in the dash-pots 17; the block 16 and parts carried thereby and the driven shaft 14 idle; the gear A in neutral position and the control lever 33 upright; all as shown in Fig. 1; and it be desired to move the automobile forwardly, first, at a relatively low speed, then at an increasing speed. The button 38 is depressed to bring the pawl 35 to engage the gear A; the control lever moved forwardly and the gear A shifted from "neutral" position to "forward" with its teeth 27 meshed with the gear 26, in which position the gear A is held by the ball 42 and dwell 44. The pawl 35 is then disengaged from the gear A upon a release of the button 38 and the control lever moved further forwardly to partially close the ports 24 which retards the surge of oil in the dash pots and causes the stress rods to reciprocate at speeds less than the rotary speed of the cam race with the result that the block 16, shaft 25, gears A and 26 and driven shaft 14 are rotated at a slow speed. Speed increase is then obtained by further restricting the ports 24 by movement of the control lever in a forward direction.

In Figs. 4, 5 and 6 the port relation between the dash pots and slide valves is clearly shown and it is to be particularly noted that the ports 23 are of greater length than the ports 24. It is by this expedient that the gear A may be set without affecting the free surging of the oil or destroying the "neutral" condition of the valves. The valve shifting means C is permanently secured to the control lever so that during the setting of the gears the ports of the valves are so disposed as to hold the driven parts all disconnected from the driving parts. After a setting of the gears a continued motion of the sliding valves effects a graded or full "drive" of the driven shaft.

To move the car rearwardly the gears and valves are first set at neutral and the operation as just described for forward motion is repeated except that the control lever is moved rearwardly instead of forwardly.

As has been recited, the motor is of the ordinary type having its own speed controlling means, and in this disclosure the shaft 10 represents such motor. With this understanding it is obvious that the motor may be controlled as desired and the driven shaft both directionally and speed controlled independently of the motor.

I claim:

1. A transmission comprising a driving shaft, a driven shaft, a block connected for rotating the driven shaft, a dash-pot carried by the block, a stress bar bearing a piston operating in the dash-pot, an element connected for rotation by the driving shaft, cams carried by said element for the movements of said stress bar, ports for said dash-pot, a tubular valve having ports of greater lengths than the ports of the dash-pot, and means for operating the tubular valve.

2. In a transmission a driving shaft, a driven shaft, means adapted to connect said shafts and to control the speed of rotation of the driven shaft, said means comprising a block connected for rotating the driven shaft, a plurality of dash-pots carried by the block, each having a plurality of fluid ports, pistons in the dash-pots, a stress-bar carrying each of the pistons, an element connected for rotation by the driving shaft, cams carried by said element for the movement of the stress-bars, a tubular valve for each dash-pot having ports of greater lengths than those of the dash-pot; and control means for the transmission, operating through the tubular valves.

SAMUEL C. IGOU.